United States Patent
Nanba et al.

(10) Patent No.: US 6,680,684 B2
(45) Date of Patent: Jan. 20, 2004

(54) DATA REPRODUCTION DEVICE WITH SIMPLIFIED CIRCUIT STRUCTURE

(75) Inventors: Akira Nanba, Kato (JP); Kenichi Hamada, Kato (JP); Masakazu Taguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/331,552

(22) Filed: Dec. 31, 2002

(65) Prior Publication Data

US 2003/0090403 A1 May 15, 2003

Related U.S. Application Data

(62) Division of application No. 09/774,100, filed on Jan. 31, 2001, now Pat. No. 6,603,419.

(30) Foreign Application Priority Data

Jun. 29, 2000 (JP) ........................................ 2000-196999

(51) Int. Cl.[7] ................................................ H03M 1/12
(52) U.S. Cl. ..................................... 341/155; 369/59.9
(58) Field of Search ................................. 341/123, 155

(56) References Cited

U.S. PATENT DOCUMENTS

| 4,989,196 A | * | 1/1991 | Ishikawa et al. | 369/53.34 |
| 5,598,389 A | * | 1/1997 | Nakano et al. | 369/47.32 |
| 5,745,468 A | * | 4/1998 | Nakano | 369/59.19 |

FOREIGN PATENT DOCUMENTS

| JP | 4-4341928 | | 11/1992 |
| JP | 404341928 | * | 11/1992 |
| JP | 5-74057 | | 3/1993 |
| JP | 8-163399 | | 6/1996 |
| JP | 08163399 | * | 6/1996 |
| JP | 8-339545 | | 12/1996 |
| JP | 9-73734 | | 3/1997 |
| JP | 9-120598 | | 5/1997 |

* cited by examiner

*Primary Examiner*—Jean Jeanglaude
(74) *Attorney, Agent, or Firm*—Armstrong, Krarz, Quintos, Hanson & Brooks, LLP

(57) ABSTRACT

A data reproduction device includes an A/D converter quantizing a reproduction signal read from data recorded on a recording medium to produce quantized data based on a sampling clock; a reproduction signal determination unit determining rising and falling parts of the reproduction signal based on the quantized data, and outputting a gate signal corresponding to a result of determining the rising and falling parts; a leading-edge clock generation unit generating a leading-edge clock signal synchronous to a leading edge indicating a rising part of the reproduction signal; a trailing-edge clock generation unit generating a trailing-edge clock signal synchronous to a trailing edge indicating a falling part of the reproduction signal; a signal switch unit generating the sampling clock by selecting one of the leading-edge clock signal and the trailing-edge clock signal based on a value of the gate signal; and a signal supply unit supplying the sampling clock to the A/D converter, wherein the data reproduction device reproduces the data recorded on the recording medium by executing digital signal processing on the quantized data. The data reproduction device can share a single A/D converter and a single decoder used for reproducing recorded data based on clocks synchronous to a leading edge and a trailing edge of the recording pit. As a result, a circuit structure of the data reproduction device is simplified, thereby achieving decreases in a size of an implementation area and in the number of implemented parts in the circuit structure of the data reproduction device.

7 Claims, 5 Drawing Sheets

FIG.5A DATA QUANTIZED BY A/D CONVERTER 2

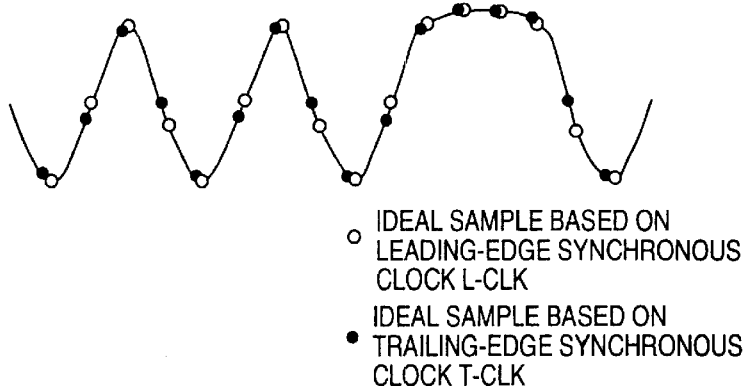

○ IDEAL SAMPLE BASED ON LEADING-EDGE SYNCHRONOUS CLOCK L-CLK

● IDEAL SAMPLE BASED ON TRAILING-EDGE SYNCHRONOUS CLOCK T-CLK

FIG.5B OUTPUT SIGNAL OF DIGITAL COMPARATOR 7, OR OUTPUT SIGNAL OF MASK-GATE-SIGNAL GENERATION CIRCUIT 14

FIG.5C OUTPUT SIGNAL OF DOUBLE MULTIPLIER 9

FIG.5D OUTPUT SIGNAL OF FF CIRCUIT 10   TRAILING EDGE   LEADING EDGE   TRAILING EDGE   LEADING EDGE   TRAILING EDGE

FIG.5E LEADING-EDGE SYNCHRONOUS CLOCK (L-CLK)

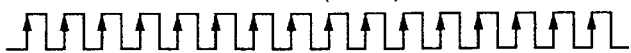

FIG.5F TRAILING-EDGE SYNCHRONOUS CLOCK (T-CLK)

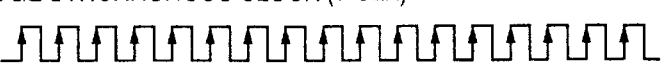

FIG.5G SAMPLING CLOCK OUTPUTTED FROM MUX 11

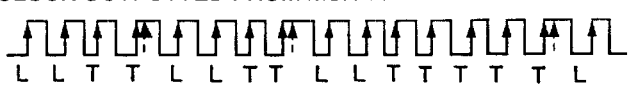

L L T T L L T T L L T T T T L

FIG.5H DATA QUANTIZED BY A/D CONVERTER 2 (ACTUAL SAMPLE)

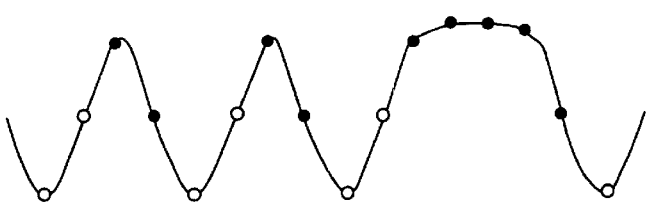

DATA REPRODUCTION DEVICE WITH SIMPLIFIED CIRCUIT STRUCTURE

This is a Divisional of Ser. No. 09/774,100 filed Jan. 31, 2001 now U.S. Pat. No. 6,603,419.

BACKGROUND OF THE INVENTION

1. Field of the Invention

The present invention relates to a data reproduction device reproducing recorded data applied to a data storage device such as an optical magnetic disk device, and more particularly relates to a data reproduction device capable of sampling a reproduction signal obtained from recorded data corresponding to a rising part and a falling part of the reproduction signal with a simple circuit structure.

2. Description of the Related Art

With recent development of a digital information society, use of a data reproduction device utilizing a magnetic disk, an optical magnetic disk or the like for storing information such as images is found in an increasing number of areas because of its high storage capacity, high reliability and exchangeability.

In general, a conventional data reproduction device executes the following steps for reproducing recorded data correctly even if each recording pit recorded on an optical magnetic disk is deformed by a change in its surrounding temperature. FIG. 1 is a block diagram showing a circuit structure of a conventional data reproduction device used for reproducing recorded data. A data reproduction device 100 shown in FIG. 1 includes an analog front end 101, A/D (Analog/Digital) converters 102 and 103, ML (Maximum Likelihood) decoders 104 and 105, PLL (Phase-Locked Loop) circuits 106 and 107, and a data composition circuit 108.

The analog front end 101 receives an optical reproduction signal from a data storage device such as an optical magnetic disk device, and supplies the optical reproduction signal to the A/D converters 102 and 103. The A/D converter 102 quantizes amplitude of a waveform of the optical reproduction signal based on a standard point, and outputs quantized data (amplitude) to the ML decoder 104. The ML decoder 104 detects a rising part of the optical reproduction signal from the quantized data, generates a leading-edge detection signal corresponding to the rising part, and supplies the leading-edge detection signal to the PLL circuit 106. Additionally, the ML decoder 104 decodes sample values sampled based on a leading-edge synchronous clock synchronous to the leading-edge detection signal, and then supplies decoded data to the data composition circuit 108. Additionally, the PLL circuit 106 generates the leading-edge synchronous clock based on the leading-edge detection signal received from the ML decoder 104, and supplies the leading-edge synchronous clock to the A/D converter 102. Similarly, The A/D converter 103 quantizes the amplitude of the waveform of the optical reproduction signal based on a standard point, and outputs quantized data (amplitude) to the ML decoder 105. The ML decoder 105 detects a falling part of the optical reproduction signal from the quantized data, generates a trailing-edge detection signal corresponding to the falling part, and supplies the trailing-edge detection signal to the PLL circuit 107. Additionally, the ML decoder 105 decodes sample values sampled based on a trailing-edge synchronous clock synchronous to the trailing-edge detection signal, and then supplies decoded data to the data composition circuit 108. Additionally, the PLL circuit 107 generates the trailing-edge synchronous clock based on the trailing-edge detection signal received from the ML decoder 105, and supplies the trailing-edge synchronous clock to the A/D converter 103. Furthermore, the data composition circuit 108 composes the decoded data supplied from the ML decoders 104 and 105, and outputs composed data as reproduced data therefrom.

As described above, a conventional data reproduction device achieves accurate decoding of recorded data by including an A/D converter, an ML decoder and a PLL circuit for decoding the optical reproduction signal based on the leading-edge synchronous clock, and for decoding the optical reproduction signal based on the trailing-edge synchronous clock.

However, the conventional data reproduction device includes the A/D converters 102 and 103 used for detecting the leading edge and the trailing edge respectively. Thus, a cost of producing such a conventional data reproduction device increases with an increase in the number of parts implemented for detecting the leading edge and the trailing edge separately, and with an increase in an area of implementing the parts in the conventional data reproduction device. Additionally, by fabricating digital circuits and analog circuits intermingled as an LSI (Large Scale Integrated) circuit, the number of gates on the LSI circuit increases. Consequently, power consumed by the LSI circuit increases.

SUMMARY OF THE INVENTION

Accordingly, it is a general object of the present invention to provide a data reproduction device reproducing data from a recording medium. A more particular object of the present invention is to provide a data reproduction device capable of sampling data based on a leading edge and a trailing edge of a recording pit of a recording medium with a simplified circuit structure.

The above-described object of the present invention is achieved by a data reproduction device including an A/D converter quantizing a reproduction signal read from data recorded on a recording medium to produce quantized data based on a sampling clock; a reproduction signal determination unit determining rising and falling parts of the reproduction signal based on the quantized data, and outputting a gate signal corresponding to a result of determining the rising and falling parts; a leading-edge clock generation unit generating a leading-edge clock signal synchronous to a leading edge indicating a rising part of the reproduction signal; a trailing-edge clock generation unit generating a trailing-edge clock signal synchronous to a trailing edge indicating a falling part of the reproduction signal; a signal switch unit generating the sampling clock by selecting one of the leading-edge clock signal and the trailing-edge clock signal based on a value of the gate signal; and a signal supply unit supplying the sampling clock to the A/D converter, wherein the data reproduction device reproduces the data recorded on the recording medium by executing digital signal processing on the quantized data.

According to the present invention, the data reproduction device is capable of sharing a single A/D converter and a single decoder for reproducing recorded data based on a clock synchronous to a leading edge of a recording pit and a clock synchronous to a trailing edge of the recording pit. As a result, a circuit structure of the data reproduction device is simplified, thereby achieving decrease in a size of an implementation area and in the number of implemented parts in the circuit structure of the data reproduction device. Additionally, the data reproduction device according to the present invention effectively achieves decreases in cost and consumed power.

Other objects, features and advantages of the present invention will become more apparent from the following detailed description when read in conjunction with the accompanying drawings.

BRIEF DESCRIPTION OF THE DRAWINGS

FIGS. 5A through 5H are timing charts for signals used in the data reproduction device.

DESCRIPTION OF THE PREFERRED EMBODIMENTS

A description will now be given of preferred embodiments of the present invention, with reference to the accompanying drawings.

Figure 1:
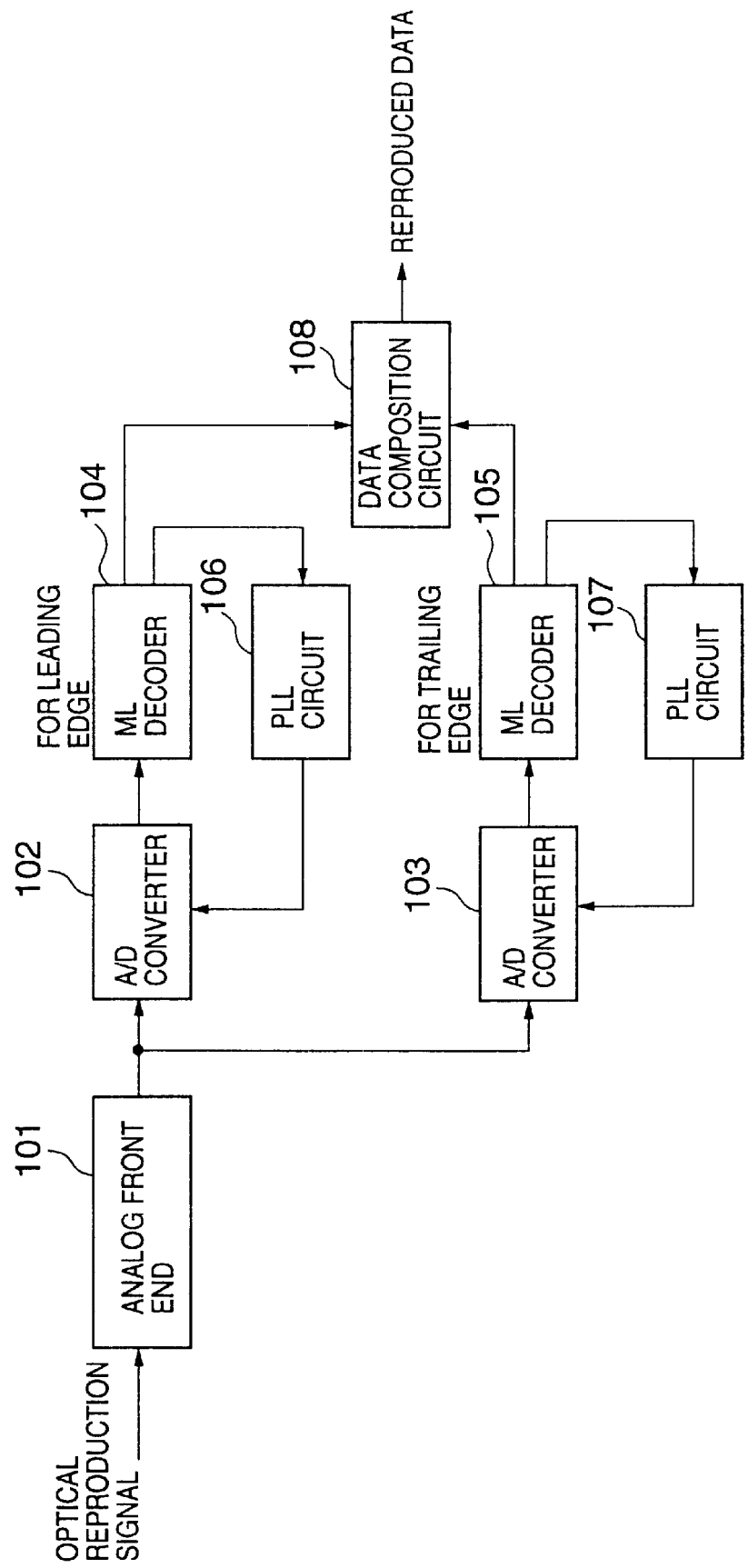
FIG. 1 is a block diagram showing a circuit structure of a conventional data reproduction device for reproducing data from a data storage device.
Figure 2:
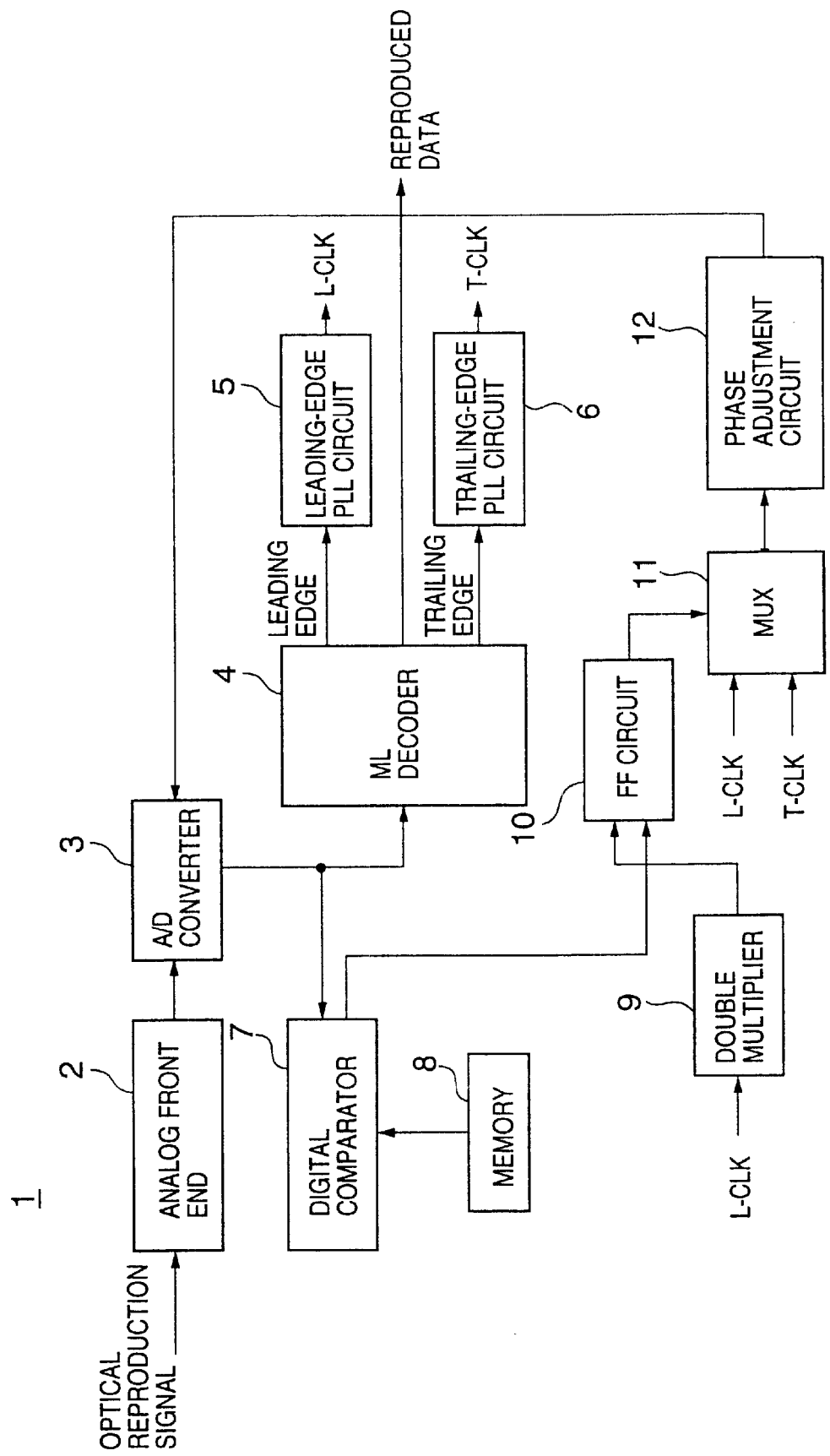
FIG. 2 is a block diagram showing a circuit structure of a data reproduction device according to a first embodiment of the present invention.

FIG. 2 is a block diagram showing a circuit structure of a data reproduction device according to a first embodiment of the present invention. A data reproduction device 1 shown in FIG. 2 includes an analog front end 2, an A/D (Analog/Digital) converter 3, an ML (Maximum Likelihood) decoder 4, a leading-edge PLL (Phase-Locked Loop) circuit 5, a trailing-edge PLL circuit 6, a digital comparator 7, a memory 8, a double multiplier 9, an FF (Flip-Flop) circuit 10, a MUX (Multiplexer) 11, and a phase adjustment circuit 12.

The analog front end 2 receives an analog optical reproduction signal from recorded data, and equalizes and amplifies the analog optical reproduction signal. The analog front end 2 then supplies the analog optical reproduction signal to the A/D converter 3. The A/D converter 3 quantizes the amplitude of a waveform of the analog optical reproduction signal supplied from the analog front end 2 based on a standard point, and supplies quantized data to the ML decoder 4 and to the digital comparator 7. The ML decoder 4, by following a digital signal process based on an ML method such as a Viterbi decoding based on a PRML (Partial Response Maximum Likelihood) method, decodes sample values sampled based on a sampling clock whose phase has been adjusted to be synchronous to a leading-edge detection signal or a trailing-edge detection signal, and outputs decoded data as reproduced data from the data reproduction device 1. On the other hand, the ML decoder 4 detects a phase difference between the reproduced data and the sampling clock, and outputs the leading-edge detection signal corresponding to a rising part of the analog optical reproduction signal to the leading-edge PLL circuit 5. Additionally, the ML decoder 4 outputs the trailing-edge detection signal corresponding to a falling part of the analog optical reproduction signal to the trailing-edge PLL circuit 6.

The leading-edge PLL circuit 5 generates a leading-edge synchronous clock L-CLK based on the leading-edge detection signal supplied from the ML decoder 4, and supplies the clock L-CLK to the MUX 11 and to the double multiplier 9. Similarly, the trailing-edge PLL circuit 6 generates a trailing-edge synchronous clock T-CLK based on the trailing-edge detection signal supplied from the ML decoder 4, and supplies the clock T-CLK to the MUX 11.

On the other hand, the digital comparator 7 generates a clock mask signal by comparing the quantized data supplied from the A/D converter 3 and a predetermined slice level (standard level) set in the memory 8, and outputs the clock mask signal to the FF circuit 10. The standard level is data indicating, for example, a center of the quantized data. The double multiplier 9 doubles a clock speed of the clock L-CLK, and supplies a doubled clock L-CLK to the FF circuit 10. The FF circuit 10 shifts the doubled clock L-CLK by a half clock cycle, and then synchronizes the clock mask signal supplied from the digital comparator 7 to the doubled clock L-CLK with its phase being shifted by the half clock cycle. Subsequently, the FF circuit 10 supplies the clock mask signal to the MUX 11. The MUX 11 controls a gate signal (clock mask signal) that switches a clock. For example, the MUX 11 opens a gate for the clock L-CLK if the clock mask signal supplied from the FF circuit 10 is low, or opens a gate for the clock T-CLK if the clock mask signal supplied from the FF circuit 10 is high. In other words, the MUX 11 selects either the clock L-CLK or the clock T-CLK, and outputs a selected clock to the phase adjustment circuit 12.

The phase adjustment circuit 12 adjusts a phase of the clock selected by the MUX 11 by use of such as a delay device, and thus can output the clock with its edges being compensated. The clock compensated by the phase adjustment circuit 12 is then inputted to the A/D converter 3 to be used as the sampling clock for sampling the analog optical reproduction signal.

As described above, the data reproduction device 1 according to the present invention outputs the reproduced data by sampling the analog optical reproduction signal synchronous to the leading-edge synchronous clock for the rising part of the signal and to the trailing-edge synchronous clock for the falling part of the signal, and then by decoding the sampled values. The MUX 11 selects one of the clocks L-CLK and T-CLK based on a value of the clock mask signal. In other words, the A/D converter 3 samples the analog optical reproduction signal based on either the clock L-CLK or the clock T-CLK according to the value of the clock mask signal. Consequently, the data reproduction device 1 needs only a single A/D converter for executing sampling of the analog optical reproduction signal synchronous to the clock L-CLK and sampling the signal being synchronous to the clock T-CLK. Thus, a circuit structure of the data reproduction device 1 is simplified. Additionally, the ML decoder 4 is shared between the sampling synchronous to the clock L-CLK and the sampling synchronous to the clock T-CLK according to the circuit structure of the data reproduction device 1 shown in FIG. 2. Alternatively, the data reproduction device 1 may share the A/D converter 3 between the sampling synchronous to the clock L-CLK and the sampling synchronous to the clock T-CLK, and may include the ML decoder 4 for each of the sampling synchronous to the clock L-CLK and the sampling synchronous to the clock T-CLK. Additionally, the clock L-CLK may be multiplied by a number "N" higher than two. In such a case, the FF circuit 10 shifts the clock mask signal by a 1/N clock cycle, and supplies a shifted clock mask signal to the MUX 11. Additionally, by including the memory 8 in the data reproduction device 1, a device located outside the data reproduction device 1 such as a processing unit (CPU) becomes capable of setting the slice level (standard level) in the memory 8 according to a circuit structure of the data reproduction device 1, in a case of fabricating the data reproduction device 1 as an LSI circuit.

The data reproduction device according to the present invention is capable of detecting the leading edge and the trailing edge based on the phase difference between the quantized data and the sampling clock, and of sampling the reproduction signal with a single A/D converter by synchronizing the reproduction signal to the leading edge and the trailing edge of the recording pit. Accordingly, the data reproduction device does not need to include an A/D converter for each of the leading edge and the trailing edge, thereby simplifying the circuit structure of the data reproduction device.

Additionally, the data reproduction device according to the present invention includes a memory so that the fixed standard value stored in the memory may be modified from a device such as a CPU (Central Processing Unit) outside the data reproduction device. Thus, in a case in which a circuit structure of a device providing the reproduction signal to the data reproduction device or the circuit structure of the data reproduction device is changed, the fixed standard value can be modified according to the circuit structure.

Additionally, the data reproduction device can execute sampling of the reproduction signal corresponding to the leading-edge clock when the reproduction signal is rising, and to the trailing-edge clock when the reproduction signal is falling, since the sampling lock is generated based on the gate signal (clock mask signal) synchronous to a delayed clock. Additionally the data reproduction device can execute sampling of the reproduction signal slightly slower than a rising edge of the reproduction signal corresponding to the leading-edge clock, and slightly slower than a falling edge of the reproduction signal corresponding to the trailing-edge clock since the sampling clock may be generated based on the gate signal that is delayed by some clock cycles. Accordingly, only a single sampling clock is necessary for execution of sampling the reproduction signal. Additionally, the data reproduction device can execute sampling of the reproduction signal appropriately by adjusting the phase of the sampling clock using the phase adjustment circuit 12.

Figure 3:
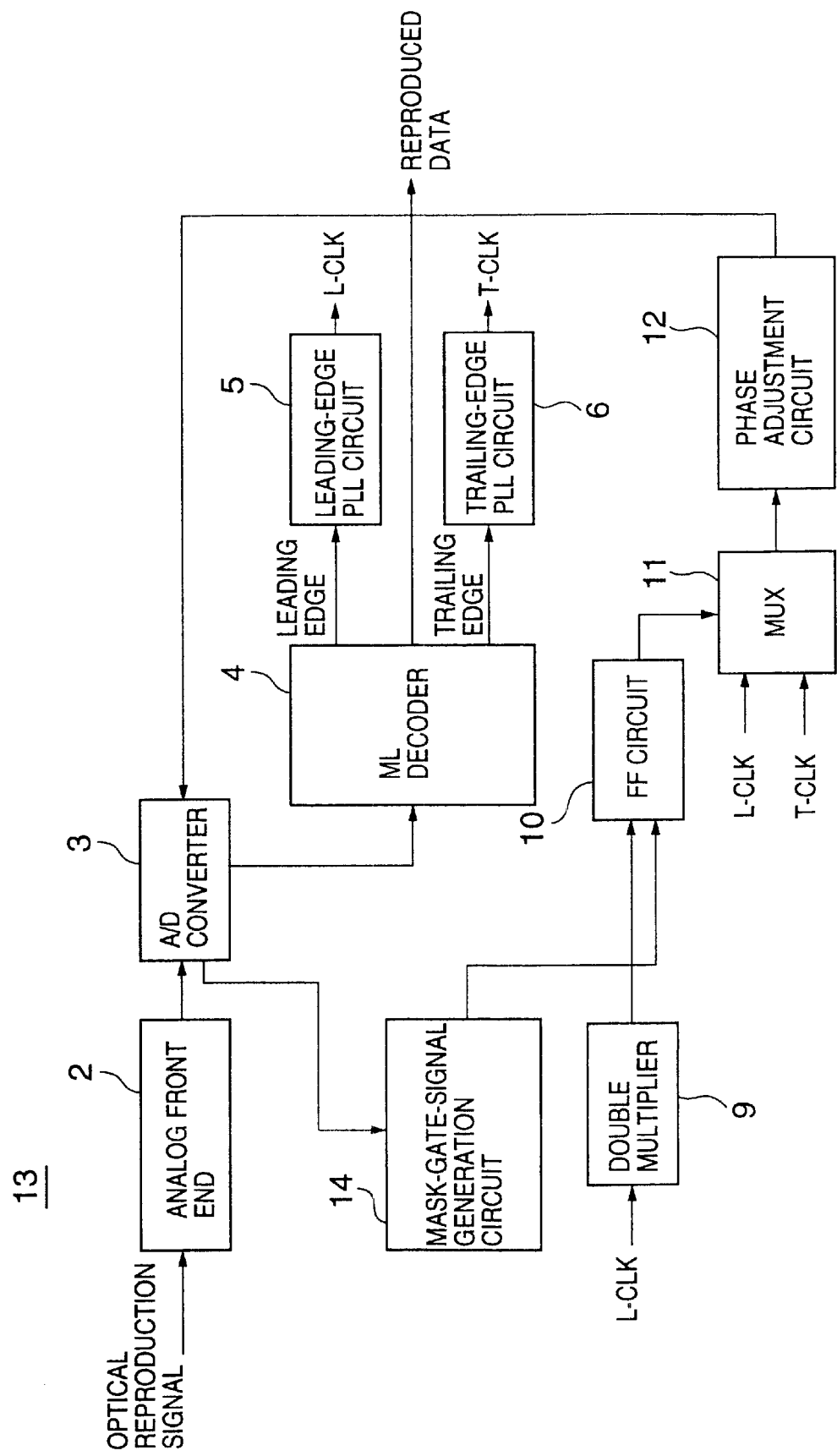
FIG. 3 is a block diagram showing a circuit structure of a data reproduction device according to a second embodiment of the present invention.

A description will now be given of a second embodiment in which a single A/D converter is shared between sampling an analog optical signal based on the leading-edge synchronous clock L-CLK and sampling based on the trailing-edge synchronous clock T-CLK, with reference to FIG. 3. FIG. 3 is a block diagram showing a circuit structure of the data reproduction device according to the second embodiment of the present invention. A data reproduction device 13 shown in FIG. 3 includes an analog front end 2, an A/D converter 3, an ML decoder 4, a leading-edge PLL circuit 5, a trailing-edge PLL circuit 6, a double multiplier 9, an FF circuit 10, a MUX 11, a phase adjustment circuit 12, and a mask-gate-signal generation circuit 14. An identical unit number is attached to a unit shown in FIG. 2 and to its corresponding unit shown in FIG. 3.

The analog front end 2 equalizes and amplifies an analog optical reproduction signal supplied from recorded data. The analog front end 2 then supplies an amplified analog optical reproduction signal to the A/D converter 3. The A/D converter 3 quantizes the amplified analog optical reproduction signal. The mask-gate-signal generation circuit 14 generates a mask gate signal by obtaining a bit value corresponding to a center of quantized data from an internal circuit of the A/D converter 3, and by setting the bit value as a standard level. Subsequently, the mask-gate-signal generation circuit 14 supplies the mask gate signal to the FF circuit 10. The FF circuit 10 shifts the mask gate signal by a half clock cycle based on the leading-edge synchronous clock L-CLK whose clock speed is doubled by the double multiplier 9, and then supplies a shifted mask gate signal to the MUX 11. The MUX 11 controls a gate for the leading-edge synchronous clock L-CLK and a gate for the trailing-edge synchronous clock T-CLK based on the shifted mask gate signal supplied from the FF circuit 10 similarly to a process executed by the MUX 11 shown in FIG. 2. Subsequently, the MUX 11 outputs one of the clocks L-CLK and T-CLK as a sampling clock to the A/D converter 3 through the phase adjustment circuit 12.

As described above, the mask-gate-signal generation circuit 14 generates the mask gate signal based on the bit value corresponding to the center of the quantized data obtained from the internal circuit of the A/D converter 3. The MUX 11 then selects one of the clocks L-CLK and T-CLK used for sampling the analog optical reproduction signal, according to the value of the mask gate signal. Thus, the A/D converter 3 is shared between the sampling the analog optical reproduction signal at the clock L-CLK and the sampling at the clock T-CLK, thereby achieving simplification of the circuit structure of the data reproduction device 13.

Figure 4:
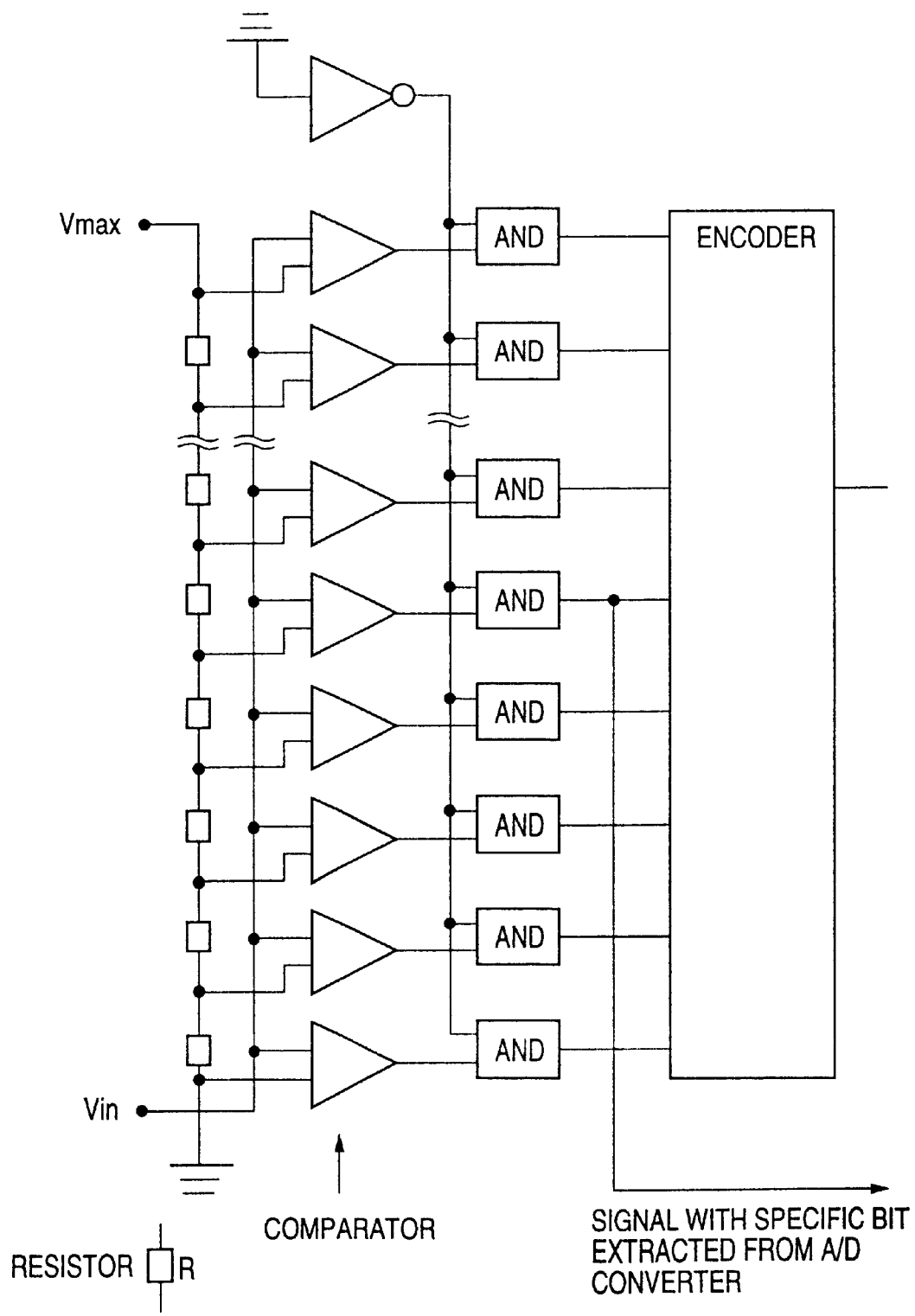
FIG. 4 is a circuit diagram showing an internal circuit structure of an A/D converter from which a standard bit value is extracted.

FIG. 4 is a circuit diagram showing an internal circuit structure of the A/D converter 3 from which the bit value is extracted. The internal circuit of the A/D converter 3 shown in FIG. 4 includes an encoder, a plurality of resistors R, comparators, and AND circuits according to a quantization size. The A/D converter 3 quantizes an analog reproduction signal supplied from the analog front end 2 by comparing a voltage Vin of the analog reproduction signal and a standard voltage Vmax. The mask-gate-signal generation circuit 14 can generate the mask gate signal based on the bit value corresponding to the center of the quantized data extracted by use of the internal circuit of the A/D converter 3 shown in FIG. 4. Accordingly, the data reproduction device according to the present invention can share the A/D converter 3 simply by constructing the A/D converter 3 as shown in FIG. 4.

FIGS. 5A through 5H are timing charts for signals used in the data reproduction device according to the present invention. FIG. 5A shows data quantized by the A/D converter 3. White circles shown in FIG. 5A indicate sampling points in a case of sampling the analog reproduction signal supplied from the analog front end 2 by use of the leading-edge synchronous clock L-CLK shown in FIG. 5E. Black circles shown in FIG. 5B indicate sampling points in a case of sampling the analog reproduction signal by use of the trailing-edge synchronous clock T-CLK shown in FIG. 5F. FIG. 5B shows the clock mask signal outputted from the digital comparator 7 or the mask gate signal outputted from the mask-gate-signal generation circuit 14. For example, when a signal shown in FIG. 5B is high, the signal indicates a trailing edge. On the other hand, a low signal indicates a leading edge.

FIG. 5C shows an output signal of the double multiplier 9. The double multiplier 9 outputs the leading-edge synchronous clock L-CLK after doubling the clock speed of the clock L-CLK. FIG. 5D shows an output signal of the FF circuit 10. The FF circuit 10 shifts the signal shown in FIG. 5B so that the signal shown in FIG. 5B becomes a half cycle late compared to the leading-edge synchronous clock L-CLK, the signal shown in FIG. 5B being synchronous to the output signal of the double multiplier 9. FIG. 5G shows a sampling clock after processing the leading-edge synchronous clock L-CLK and the trailing-edge synchronous clock T-CLK based on the output signal of the FF circuit 10 by use of the MUX 11. A character "L" in FIG. 5G indicates the leading-edge clock L-CLK outputted from the MUX 11. A character "T" in FIG. 5G indicates the trailing-edge synchronous clock T-CLK outputted from the MUX 11. FIG. 5H shows the quantized data sampled based on the sampling clock shown in FIG. 5G. White circles in FIG. 5H indicate sampling points based on the leading-edge synchronous clock L-CLK. Black circles in FIG. 5H indicate sampling points based on the trailing-edge synchronous clock T-CLK.

In the above-described circuit structure of the data reproduction device, in a case in which edges of the leading-edge synchronous clock L-CLK and the trailing-edge synchronous clock T-CLK occur at the same time, such a clock hazard may be masked by making the clocks L-CLK and T-CLK into a single clock by use of a mono-multi method to deal with the clock hazard. To be concrete, in a case in which edges of the leading-edge synchronous clock L-CLK and the trailing-edge synchronous clock T-CLK occur at the same time or almost at the same time with little difference, the clocks L-CLK and T-CLK may be outputted at the same time because of the little difference depending on a signal timing of the output signal of the FF circuit 10, which is the clock mask signal or the mask gate signal shown in FIG. 5D. In such a case, a clock hazard caused by the little difference between the leading-edge synchronous clock L-CLK and the trailing-edge synchronous clock T-CLK can be masked to some degree by extending a high part of the output signal of the FF circuit 10 to some degree, that is, a period in which the trailing-edge synchronous clock T-CLK is outputted from the MUX 11, in one clock cycle such as by use of the mono-multi method. An extended period for outputting the trailing-edge synchronous clock T-CLK is variable. In other words, the clock hazard is masked by steps of detecting the edges of the leading-edge synchronous clock L-CLK and the trailing-edge synchronous clock T-CLK, and extending the period for outputting the leading-edge synchronous clock L-CLK or the trailing-edge synchronous clock T-CLK.

According to the present invention, the data reproduction device can share the A/D converter 3 for sampling the analog reproduction signal based on the leading-edge synchronous clock L-CLK and for sampling based on the trailing-edge synchronous clock T-CLK, and can detect the reproduction signal like a conventional data reproduction device that detects the reproduction signal separately based on clocks synchronous to leading edges and trailing edges of a recording pit. Thus, the number of gates fabricated on an LSI circuit decreases because of the shared A/D converter 3. Additionally, the data reproduction device can achieve correct decoding of recorded data without being affected by its surrounding temperature. Furthermore, the ML decoder 4 can execute sampling of the reproduction signal corresponding to the leading edge and the trailing edge by using a single sampling clock. Thus, composition of data executed by the conventional data reproduction device is eliminated from the data reproduction device according to the present invention.

In conclusion, according to the present invention, a data reproduction device is capable of sharing a single A/D converter and a single decoder that are used for reproducing recorded data based on a clock synchronous to a leading edge of a recording pit and a clock synchronous to a trailing edge of the recording pit. As a result, a circuit structure of the data reproduction device is simplified, thereby achieving decrease in a size of an implementation area and in the number of implemented parts in the circuit structure of the data reproduction device. Additionally, the data reproduction device according to the present invention effectively achieves decreases in cost and consumed electricity.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-196999, filed on Jun. 29, 2000, the entire contents of which are hereby incorporated by reference.

What is claimed is:

1. A data reproduction device comprising:

an A/D (Analog/Digital) converter quantizing a reproduction signal read from data recorded on a recording medium to produce quantized data based on a sampling clock;

a reproduction signal determination unit including a single maximum likelihood decoder which determines rising and falling parts of said reproduction signal based on the quantized data, and outputting a gate signal corresponding to a result of determining the rising and falling parts;

a leading-edge clock generation unit generating a leading-edge clock signal synchronous to a leading edge indicating a rising part of said reproduction signal;

a trailing-edge clock generation unit generating a trailing-edge clock signal synchronous to a trailing edge indicating a falling part of said reproduction signal;

a signal switch unit generating the sampling clock by selecting one of the leading-edge clock signal and the trailing-edge clock signal based on a value of the gate signal; and a signal supply unit supplying the sampling clock to said A/D converter, wherein said data reproduction device reproduces said data recorded on the recording medium by executing digital signal processing on said quantized data.

2. The data reproduction device as claimed in claim 1, wherein said leading-edge clock generation unit generates a clock synchronous to the leading edge of said reproduction signal as the leading-edge clock signal, said leading edge being detected based on a phase difference between said data reproduced by said data reproduction device and the sampling clock, wherein said trailing-edge clock generation unit generates a clock synchronous to the trailing edge of said reproduction signal as the trailing-edge clock signal, said trailing edge being detected based on the phase difference between said data reproduced by said data reproduction device and the sampling clock.

3. The data reproduction device as claimed in claim 1, wherein said reproduction signal determination unit determines said rising and falling parts of said reproduction signal based on a predetermined standard value.

4. The data reproduction device as claimed in claim 3, said data reproduction device further comprising a memory that stores the predetermined standard value modifiable from outside said data reproduction device, wherein said reproduction signal determination unit determines said rising and falling parts of said reproduction signal based on the predetermined standard value read from said memory.

5. The data reproduction device as claimed in claim 1, wherein said reproduction signal determination unit obtains a standard bit value from said quantized data in said A/D converter, and determines said rising and falling parts of said reproduction signal based on the standard bit value.

6. The data reproduction device as claimed in claim 1, wherein said signal switch unit generates the sampling clock based on the gate signal shifted by a fixed period.

7. The data reproduction device as claimed in claim 1, wherein said signal supply unit includes a phase adjustment unit adjusting a phase of said sampling clock supplied to said A/D converter.

* * * * *